(12) United States Patent
Bowen

(10) Patent No.: US 6,851,537 B2
(45) Date of Patent: Feb. 8, 2005

(54) WORM DRIVEN BALL SCREW ACTUATOR FOR TRACTION CLUTCHES

(75) Inventor: Thomas C. Bowen, Rochester Hills, MI (US)

(73) Assignee: Magna Drivetrain of America, Inc., Troy, MI (US)

( * ) Notice: Subject to any disclaimer, the term of this patent is extended or adjusted under 35 U.S.C. 154(b) by 0 days.

(21) Appl. No.: 10/383,404

(22) Filed: Mar. 7, 2003

(65) Prior Publication Data

US 2004/0173428 A1 Sep. 9, 2004

(51) Int. Cl.$^7$ .......................... B60K 17/35; F16D 28/00
(52) U.S. Cl. .................... 192/84.6; 192/94; 180/249
(58) Field of Search ............... 192/84.6, 84.7, 192/84.91, 94; 180/247, 248, 249

(56) References Cited

U.S. PATENT DOCUMENTS

| | | | | |
|---|---|---|---|---|
| 3,178,958 A | * | 4/1965 | Beck | 74/424.83 |
| 4,449,416 A | * | 5/1984 | Huitema | 74/336 R |
| 4,648,498 A | * | 3/1987 | Herbulot et al. | 192/94 |
| 4,805,486 A | | 2/1989 | Hagiwara et al. | |
| 4,895,236 A | | 1/1990 | Sakakibara et al. | |
| 4,976,347 A | | 12/1990 | Sakakibara et al. | |
| 5,007,886 A | | 4/1991 | Holmquist et al. | |
| 5,199,325 A | * | 4/1993 | Reuter et al. | 74/335 |
| 5,267,635 A | * | 12/1993 | Peterson et al. | 192/90 |
| 5,323,871 A | | 6/1994 | Wilson et al. | |
| 5,407,024 A | | 4/1995 | Watson et al. | |
| 5,423,235 A | | 6/1995 | Botterill et al. | |
| 5,562,192 A | * | 10/1996 | Dick | 192/84.1 |
| 6,398,686 B1 | | 6/2002 | Irwin | |
| 6,698,565 B2 | | 3/2004 | Cool et al. | |

FOREIGN PATENT DOCUMENTS

| | | |
|---|---|---|
| JP | 62-18117 | 1/1987 |
| JP | 3-66927 | 3/1991 |

* cited by examiner

*Primary Examiner*—Richard M. Lorence
(74) *Attorney, Agent, or Firm*—Harness, Dickey & Pierce P.L.C.

(57) ABSTRACT

A torque transfer mechanism for controlling the magnitude of a clutch engagement force exerted on a clutch pack that is operably disposed between a first rotary member and a second rotary member includes an actuator having an inner sleeve, an outer sleeve, and a plurality of balls. The inner sleeve is supported for rotation relative to the first rotary member and each of the inner and outer sleeves includes a spiral groove aligned with the other. The balls are positioned within the spiral grooves between the inner and outer sleeves. An electric motor selectively rotates one of the inner and outer sleeves so as to induce axial movement of the other of the inner and outer sleeves to engage the clutch.

14 Claims, 8 Drawing Sheets

WORM DRIVEN BALL SCREW ACTUATOR FOR TRACTION CLUTCHES

FIELD OF THE INVENTION

The present invention relates generally to power transfer systems for controlling the distribution of drive torque between the front and rear drivelines of a four-wheel drive vehicle. More particularly, the present invention is directed to a transfer clutch adapted for use in motor vehicle driveline applications having a clutch actuator that is operable for controlling actuation of a ball-screw operator associated with a multi-plate clutch assembly.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a transfer case is interconnected between the primary and secondary drivelines which is equipped with a dog-type mode clutch that can be selectively engaged for rigidly coupling the secondary driveline to the primary driveline to establish a part-time four-wheel drive mode. In contrast, when the mode clutch is disengaged, drive torque is only delivered to the primary driveline for establishing a two-wheel drive mode.

A modern trend in four-wheel drive motor vehicles is to equip the transfer case with an electronically-controlled transfer clutch in place of the mode clutch. The transfer clutch is operable for automatically directing drive torque to the secondary wheels, without any input or action on the part of the vehicle operator, when traction is lost at the primary wheels for establishing an on-demand four-wheel drive mode. Typically, the transfer clutch includes a multi-plate clutch assembly that is installed between the primary and secondary output shafts of the transfer case and which is actuated by a power-operated actuator in response to control signals sent from a controller. The control signals are typically based on current operating characteristics of the vehicle (i.e., vehicle speed, interaxle speed difference, acceleration, steering angle, etc.) as detected by various sensors. Thus, such "on-demand" transfer cases can utilize adaptive control schemes for automatically controlling torque distribution during all types of driving and road conditions.

In many instances, the vehicle operator is also permitted to select between the two-wheel drive mode and the part-time four-wheel drive mode in addition to the on-demand four-wheel drive mode. Specifically, when the two-wheel drive mode is selected, the clutch assembly is released for delivering all drive torque to the primary output shaft. In contrast, when the part-time four-wheel drive mode is selected, the clutch assembly is fully engaged for effectively locking the secondary output shaft to the primary output shaft. In such applications, a mode signal is sent to the controller which is indicative of the particular drive mode selected by the vehicle operator. Typically, the mode signal is generated by a mode selector device which is manipulated by the vehicle operator.

Currently, a large number of on-demand transfer cases are equipped with an electrically-controlled clutch actuator that can regulate the amount of drive torque transferred to the secondary output shaft as a function of the value of an electrical control signal applied thereto. In some applications, the transfer clutch employs an electromagnetic clutch as the power-operated actuator. For example, U.S. Pat. No. 5,407,024 discloses a electromagnetic coil that is incrementally activated to control movement of a ball-ramp operator for applying a clutch engagement force on a multi-plate clutch assembly. Likewise, Japanese Laid-open Patent Application No. 62-18117 discloses a transfer clutch equipped with an electromagnetic actuator for directly controlling actuation of the multi-plate clutch pack assembly. As an alternative, U.S. Pat. No. 5,323,871 discloses an on-demand transfer case having a transfer clutch equipped with an electric motor that controls rotation of a sector plate which, in turn, controls pivotal movement of a lever arm that is operable for applying a variable clutch engagement force on a multi-plate clutch assembly. Moreover, Japanese Laid-open Patent Application No. 63-66927 discloses a transfer clutch which uses an electric motor to rotate one cam plate of a ball-ramp operator for engaging a multi-plate clutch assembly. Finally, U.S. Pat. No. 4,895,236 discloses a transfer case equipped with a transfer clutch having an electric motor driving a reduction gearset for controlling movement of a ball screw operator which, in turn, applies the clutch engagement force to the clutch pack.

While many on-demand clutch control systems similar to those described above are currently used in four-wheel drive vehicles, a need exists to advance the technology and address recognized system limitations. For example, the size, weight and electrical power requirements of the electromagnetic coil or the electric motors needed to provide the described clutch engagement loads may make such system cost prohibitive in some four-wheel drive vehicle applications.

SUMMARY OF THE INVENTION

Thus, it is an object of the present invention to provide a transfer clutch having an electrically operated clutch actuator that is operable for engaging a multi-plate clutch assembly.

It is a further object of the present invention to provide a double-acting ball screw clutch operator in conjunction with a worm driven clutch actuator for use in a transfer clutch.

As a related object, the transfer clutch of the present invention is well-suited for use in motor vehicle driveline applications to control the transfer of drive torque between an input member and an output member.

In one preferred embodiment, the transfer clutch includes a worm driven actuator which controls operation of a ball screw operator for controlling the magnitude of clutch engagement force exerted on a multi-plate clutch assembly that is operably disposed between an input member and an output member. The worm driven actuator includes a cylindrical shaft having a helicoid tooth worm which receives torque from a input source enabling said worm to engage and drive a toothed gear and rotor. The ball screw operator includes a threaded screw mounted on the output member and which is splined to a second segment of the rotor, a threaded nut, a plurality of balls retained between the aligned threads of the screw and nut, and a drag spring providing a predetermined drag force between the screw and the output member. The multi-plate clutch assembly includes a drum driven by the input member, a hub driving the output member, and a clutch pack operably disposed between the drum and hub. The clutch assembly includes a pressure plate adapted to act on one end of the clutch pack.

In operation, engagement of the worm driven gear causes relative rotation between the screw and nut of the ball screw operator. As such, relative rotation in a first direction causes axial movement of the threaded nut in a first direction which, in turn, causes the pressure plate to exert a clutch engagement force on the clutch pack. Likewise, relative rotation between the screw and nut in the opposite direction causes axial movement of the nut in a second direction which, in turn, causes the pressure plate to disengage the clutch pack.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a transfer clutch that can be adaptively controlled for modulating the torque transferred from an input member to an output member. The transfer clutch finds particular application in motor vehicle drivelines as, for example, an on-demand clutch in a transfer case or in-line torque coupling, a biasing clutch associated with a differential assembly in a transfer case or a drive axle assembly, or as a shift clutch in power transmission assemblies. Thus, while the present invention is hereinafter described in association with a particular construction for use in a particular driveline application, it will be understood that the construction/application shown and described is merely intended to illustrate one embodiment of the present invention.

Figure 1:
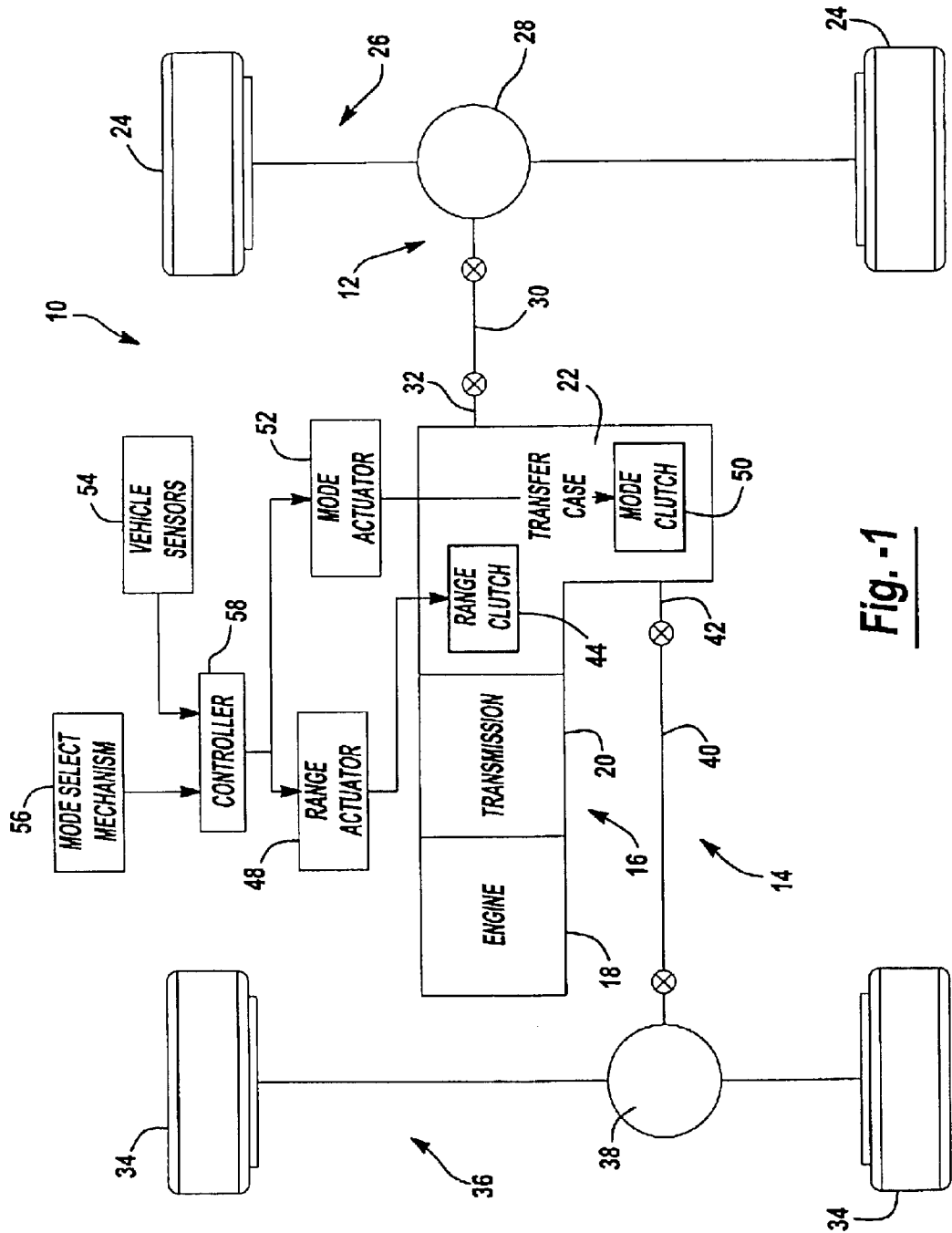
FIG. 1 illustrates the drivetrain of a four-wheel drive vehicle equipped with a transfer case incorporating the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a transfer case 22. Rear driveline 12 includes a pair of rear wheels 24 connected at opposite ends of a rear axle assembly 26 having a rear differential 28 coupled to one end of a rear prop shaft 30, the opposite end of which is coupled to a rear output shaft 32 of transfer case 22. Front driveline 14 includes a pair of front wheels 34 connected at opposite ends of a front axle assembly 36 having a front differential 38 coupled to one end of a front prop shaft 40, the opposite end of which is coupled to a front output shaft 42 of transfer case 22.

With continued reference to FIG. 1, drivetrain 10 is shown to further include an electronically-controlled power transfer system for permitting a vehicle operator to select between a two-wheel drive mode, a part-time four-wheel high-range drive mode, an on-demand four-wheel high-range drive mode, a neutral non-driven mode, and a part-time four-wheel low-range drive mode. In this regard, transfer case 22 is equipped with a range clutch 44 that is operable for establishing the high-range and low-range drive connections between an input shaft 46 and rear output shaft 32, and a power-operated range actuator 48 operable to actuate range clutch 44. Transfer case 22 also includes a mode or transfer clutch 50 that is operable for transferring drive torque from rear output shaft 32 to front output shaft 42 for establishing the part-time and on-demand four-wheel drive modes. The power transfer system further includes a power-operated mode actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of range actuator 48 and mode actuator 52 in response to input signals from vehicle sensors 54 and mode select mechanism 56.

Figure 2:
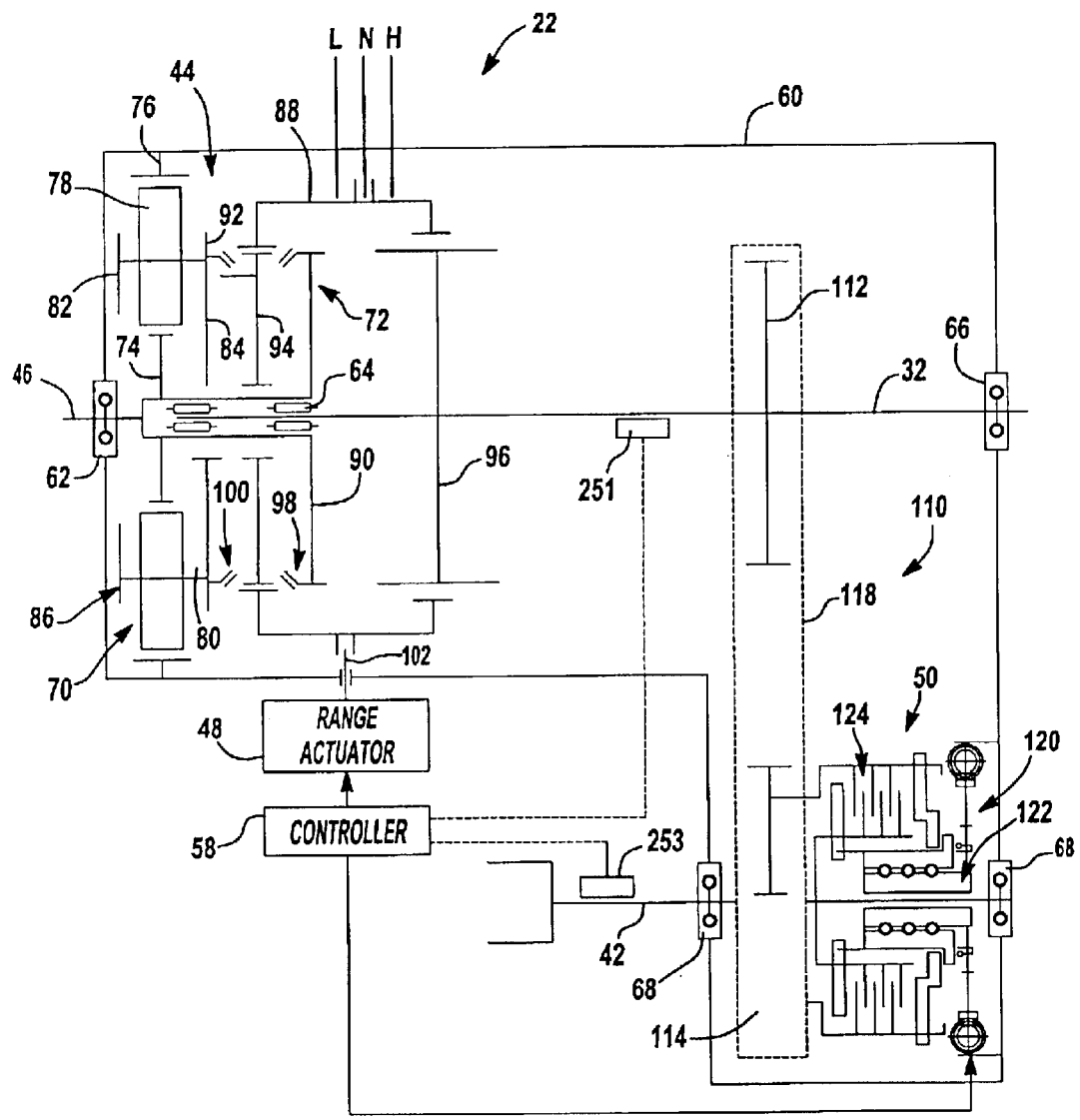
FIG. 2 is a schematic illustration of a transfer case equipped with the on-demand transfer clutch of the present invention.

Transfer case 22 is shown schematically in FIG. 2 to include a housing 60 from which input shaft 46 is rotatably supported by bearing assembly 62. Input shaft 46 is adapted for connection to the output shaft of transmission 20. Rear output shaft 32 is also shown rotatably supported between input shaft 46 and housing 60 via bearing assemblies 64 and 66 while front output shaft 42 is rotatably supported from housing 60 by a pair of laterally-spaced bearing assemblies 68. Range clutch 44 is shown to include a planetary gearset 70 and a synchronized range shift mechanism 72. Planetary gearset 70 includes a sun gear 74 fixed for rotation with input shaft 46, a ring gear 76 fixed to housing 60, and a set of planet gears 78 rotatably supported on pinion shafts 80 extending between front and rear carrier rings 82 and 84, respectively, that are interconnected to define a carrier 86. Planetary gearset 70 functions as a two-speed reduction unit which, in conjunction with a sliding range sleeve 88 of synchronized range shift mechanism 72, is operable to establish either of a first or second drive connection between input shaft 46 and rear output shaft 32. To establish the first drive connection, input shaft 46 is directly coupled to rear output shaft 32 for defining a high-range drive mode in which rear output shaft 32 is driven at a first (i.e., direct) speed ratio relative to input shaft 46. Likewise, the second drive connection is established by coupling carrier 86 to rear output shaft 32 for defining a low-range drive mode in which rear output shaft 32 is driven at a second (i.e., reduced) speed ratio relative to input shaft 46. A neutral non-driven mode is established when rear output shaft 32 is disconnected from both input shaft 46 and carrier 86.

Synchronized range shift mechanism 72 includes a first clutch plate 90 fixed for rotation with input shaft 46, a second clutch plate 92 fixed for rotation with rear carrier ring 84, a clutch hub 94 rotatably supported on input shaft 46 between clutch plates 90 and 92, and a drive plate 96 fixed for rotation with rear output shaft 32. Range sleeve 88 has a first set of internal spline teeth that are shown meshed with external spline teeth on clutch hub 94, and a second set of internal spline teeth that are shown meshed with external spline teeth on drive plate 96. As will be detailed, range sleeve 88 is axially moveable between three distinct positions to establish the high-range, low-range and neutral modes. Range shift mechanism 72 also includes a first synchronizer assembly 98 located between hub 94 and first clutch plate 90 and a second synchronizer assembly 100 is disposed between hub 94 and second clutch plate 92. Synchronizers 98 and 100 work in conjunction with range sleeve 88 to permit on-the-move range shifts.

With range sleeve 88 located in its neutral position, as denoted by position line "N", its first set of spline teeth are disengaged from the external clutch teeth on first clutch plate 90 and from the external clutch teeth on second clutch plate 92. First synchronizer assembly 98 is operable for causing speed synchronization between input shaft 46 and rear output shaft 32 in response to sliding movement of range sleeve 88 from its N position toward a high-range position, denoted by position line "H". Upon completion of speed synchronization, the first set of spline teeth on range sleeve 88 move into meshed engagement with the external clutch teeth on first clutch plate 90 while its second set of spline teeth are maintained in engagement with the spline teeth on drive plate 96. Thus, movement of range sleeve 88 to its H position acts to couple rear output shaft 32 for common rotation with input shaft 46 and establishes the high-range drive connection therebetween. Similarly, second synchronizer assembly 100 is operable for causing speed synchronization between carrier 86 and rear output shaft 32 in response to sliding movement of range sleeve 88 from its N position to a low-range position, as denoted by position line "L". Upon completion of speed synchronization, the first set of spline teeth on range sleeve 88 move into meshed engagement with the external clutch teeth on second clutch plate 92 while the second set of spline teeth on range sleeve 88 are maintained in engagement with the external spline teeth on drive plate 96. Thus with range sleeve 88 located in its L position, rear output shaft 32 is coupled for rotation with carrier 86 and establishes the low-range drive connection between input shaft 46 and rear output shaft 32.

To provide means for moving range sleeve 88 between its three distinct range positions, range shift mechanism 72 further includes a range fork 102 coupled to range sleeve 88 and which is mounted on a shift rail (not shown) for axial movement thereon. Range actuator 48 is operable to move range fork 102 on the shift rail for causing corresponding axial movement of range sleeve 88 between its three range positions. Range actuator 48 is preferably an electric motor arranged to move range sleeve 88 to a specific range position in response to a control signal from controller 58 that is based on the signal delivered to controller 58 from mode select mechanism 56.

It will be appreciated that the synchronized range shift mechanism permits "on-the-move" range shifts without the need to stop the vehicle which is considered to be a desirable feature. However, other synchronized and non-synchronized versions of range clutch 44 can be used in substitution for the particular arrangement shown. Also, it is contemplated that range clutch 44 can be removed entirely from transfer case 22 such that input shaft 46 would directly drive rear output shaft 32 to define a one-speed version of the on-demand transfer case embodying the present invention.

Figure 3:
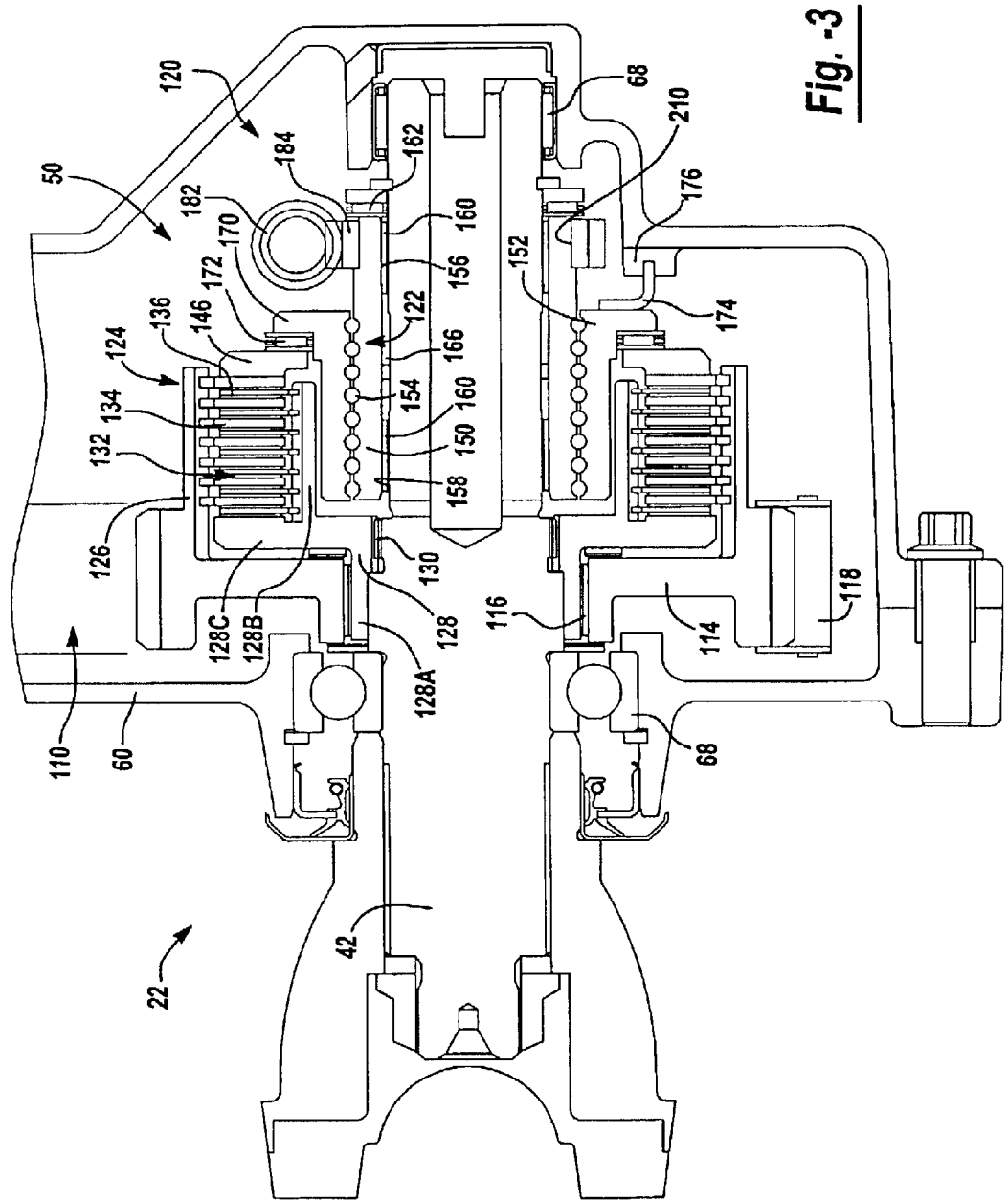
FIG. 3 is a partial sectional view of the transfer clutch arranged for selectively transferring drive torque from the rear output shaft to the front output shaft.
Figure 4:
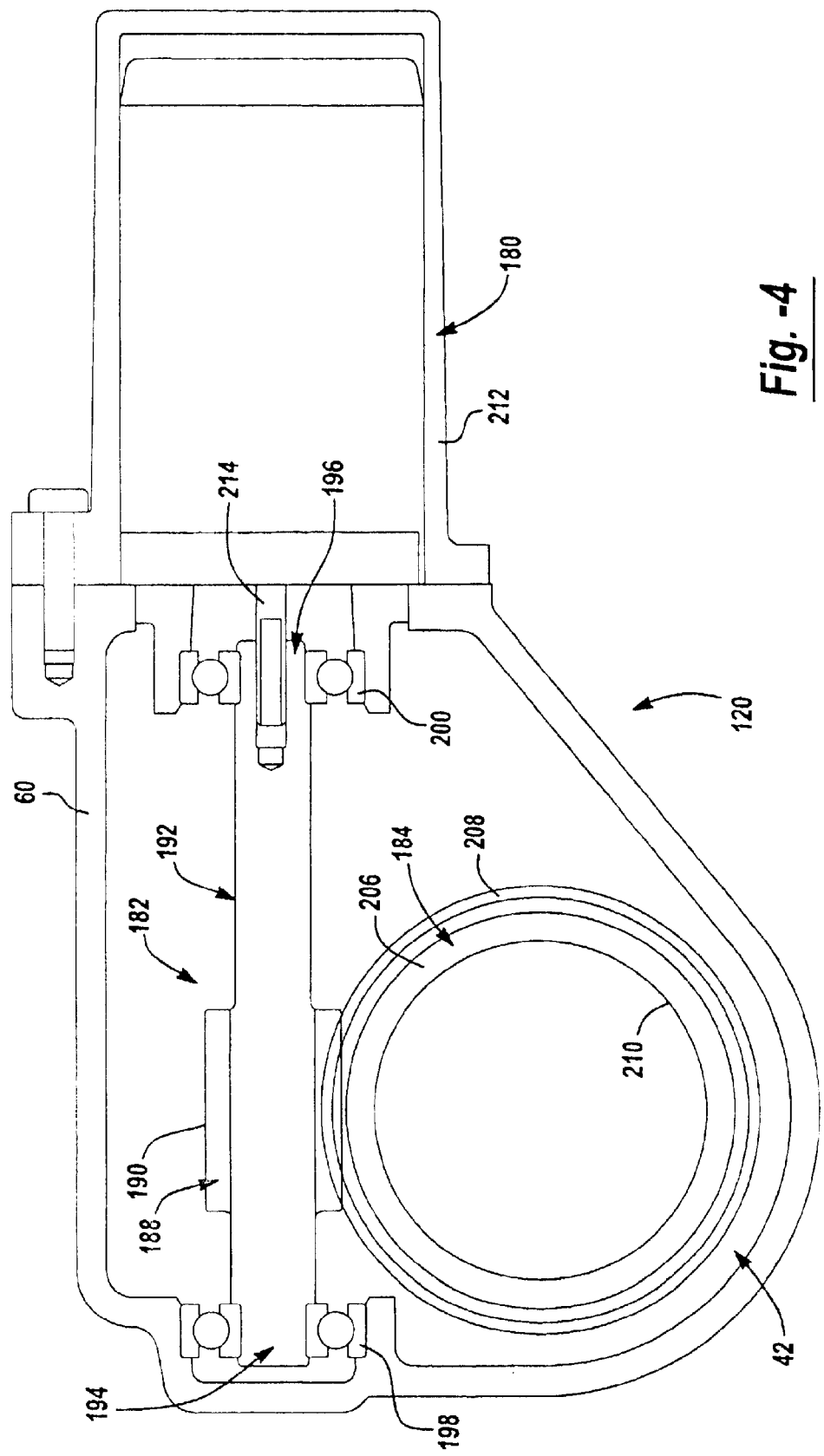
FIG. 4 is a partial sectional view of a worm gear mechanism of the present invention.

Referring now primarily to FIGS. 2-4 of the drawings, transfer clutch 50 is shown arranged in association with front output shaft 42 in such a way that it functions to deliver drive torque from a transfer assembly 110 driven by rear output shaft 32 to front output shaft 42 for establishing the four-wheel drive modes. Transfer assembly 110 includes a first sprocket 112 fixed for rotation with rear output shaft 32, a second sprocket 114 rotatably supported by bearings 116 on front output shaft 42, and a power chain 118 encircling sprockets 112 and 114. As will be detailed, mode actuator 52 includes a worm driven clutch actuator 120 while transfer clutch 50 includes a ball screw operator 122 and a multi-plate clutch assembly 124.

Clutch assembly 124 is shown to include an annular drum 126 integrally connected with the sprocket 114, a hub 128 fixed via a splined connection 130 for rotation with front output shaft 42, and a multi-plate clutch pack 132 operably disposed between drum 126 and hub 128. Hub 128 is shown to include a first smaller diameter hub segment 128A and a second larger diameter hub segment 128B that are interconnected by a radial plate segment 1280. Clutch pack 132 includes a set of outer friction plates 134 splined to drum 126 which are alternatively interleaved with a set of inner friction plates 136 splined to hub segment 128B of clutch hub 128. A pressure plate 146 is splined to the rim of drum 126 for rotation therewith.

With continued reference to FIGS. 3 and 4, ball screw operator 122 of transfer clutch 50 is shown to include an externally threaded screw 150, an internally threaded nut 152, and balls 154 disposed in aligned threads between screw 150 and nut 152. Screw 150 has an inner surface 156 that is rotatably supported on an outer surface 158 of front output shaft 42 by a pair of bearings 160. A thrust bearing assembly 162 is shown on screw 150 so as to facilitate rotation thereof relative to hub 128 and bearing assembly 68.

Nut 152 includes a radially-extending rim defining an apply plate 170 that is adapted to act on pressure plate 146. Apply plate 170 and pressure plate 146 are separated by a thrust bearing assembly 172 which permits relative rotation therebetween. A tab 174 is coupled to nut 152 and extends therefrom to engage a step 176 protruding from an inner surface of housing 60. Tab 174 prevents rotation of nut 152 to assure that rotation of screw 150 is converted to linear translation of nut 152.

Worm driven clutch actuator 120 includes an electric motor 180, a worm 182 and a gear 184. Worm 182 includes a body 188 having a single external tooth 190 formed thereon. Worm 182 also includes a shaft 192 having a first end 194 and a second end 196. First end 194 is rotatably supported within housing 60 by a first bearing 198. Second end 196 is rotatably supported within housing 60 by a second bearing 200.

Gear 184 includes a substantially cylindrical body 206 having a plurality of external teeth 208 formed thereon. A bore 210 extends through body 206. A portion of externally threaded screw 150 extends through bore 210 and is drivingly coupled to gear 184.

Electric motor 180 includes a case 212 coupled to housing 60. Electric motor 180 also includes a spindle 214 drivingly coupled to second end 196 of worm 182. Furthermore, tooth 190 is drivingly engaged with teeth 208. In the embodiment shown, gear 184 includes 37 teeth to provide a torque multiplication factor of 37:1. Output torque from spindle 214 of electric motor 180 is multiplied by worm 182 and gear 184 to cause rotation of externally threaded screw 150.

A specific feature of worm driven clutch actuator 120 is that the worm gear mechanism may not be back driven. As such, electrical input to motor 180 may be discontinued once transfer clutch 50 is engaged and the clutch will remain in the engaged mode. Electric motor 180 is controlled to rotate worm 182 in an opposite direction to release transfer clutch 50. The use of a low torque clutch actuator 120 in conjunction with ball screw operator 122 permits use of transfer clutch 50 in high torque driveline applications yet provides superior response times compared to conventional electromagnetic or electric motor type on-demand torque transfer systems.

In operation, when mode select mechanism 56 indicates selection of the two-wheel high-range drive mode, range actuator 48 is signaled to move range sleeve 88 to its H position and transfer clutch 50 is maintained in a released condition with no electric signal sent to electric motor 180, whereby all drive torque is delivered to rear output shaft 32. If mode select mechanism 56 thereafter indicates selection of a part-time four-wheel high-range mode, range sleeve 88 is maintained in its H position and an electrical control signal is sent by controller 58 to electric motor 180 of clutch actuator 120 which causes rotation of worm 182 and gear 184. Such action causes relative rotation between screw 150 and nut 152 which, as noted, causes axial movement of nut 152 for engaging clutch pack 132. If spindle 214 is rotated in a first direction, nut 152 is advanced on screw 150 in a first axial (i.e., forward) direction such that apply plate 170 moves pressure plate 146 axially from a disengaged position until a clutch engagement force is executed on clutch pack 132 for effectively coupling hub 128 to drum 126. In contrast, if spindle 214 is rotated in a second (i.e. rearward) direction opposite the first direction, nut 152 is retracted on screw 150 in a second axial direction such that nut 152 is disengaged from contacting pressure plate 146 and torque is no longer transferred from hub 128 to drum 126.

If a part-time four-wheel low-range drive mode is selected, the operation of transfer clutch 50 and clutch actuator 120 are identical to that described above for the part-time high-range drive mode. However, in this mode, range actuator 48 is signaled to locate range sleeve 88 in its L position to establish the low-range drive connection between input shaft 46 and rear output shaft 32.

When the mode signal indicates selection of the on-demand four-wheel high-range drive mode, range actuator 48 moves or maintains range sleeve 88 in its H position and clutch actuator 120 is placed in a ready or "standby" condition. Specifically, the minimum amount of drive torque sent to front output shaft 42 through transfer clutch 50 in the stand-by condition can be zero or a slight amount (i.e., in the range of 2–10%) as required for the certain vehicular application. This minimum stand-by torque transfer is generated by controller 58 sending a control signal having a predetermined minimum value to electric motor 180. Thereafter, controller 58 determines when and how much drive torque needs to be transferred to front output shaft 42 based on tractive conditions and/or vehicle operating characteristics detected by vehicle sensors 54. For example, a first speed sensor 251 (FIG. 2) sends a signal to controller 58 indicative of the rotary speed of rear output shaft 32 while a second speed sensor 253 sends a signal indicative of the rotary speed of front output shaft 42. Controller 58 can vary the magnitude of the electrical signal sent to electric motor 180 between the predetermined minimum value and a predetermined maximum value based on defined relationships such as, for example, the speed difference between output shafts 32 and 42.

While transfer clutch 50 is shown arranged on front output shaft 42, it is evident that it could easily be installed on rear output shaft 32 for transferring drive torque to a transfer assembly arranged to drive front output shaft 42. Likewise, the present invention can be used as an in-line torque transfer coupling in an all wheel drive vehicle to selectively and/or automatically transfer drive torque on-demand from the primary (i.e., front) driveline to the secondary (i.e., rear) driveline. Likewise, in full-time transfer cases equipped with an interaxle differential, transfer clutch 50 could be used to limit slip and bias torque across the differential.

Figure 5:
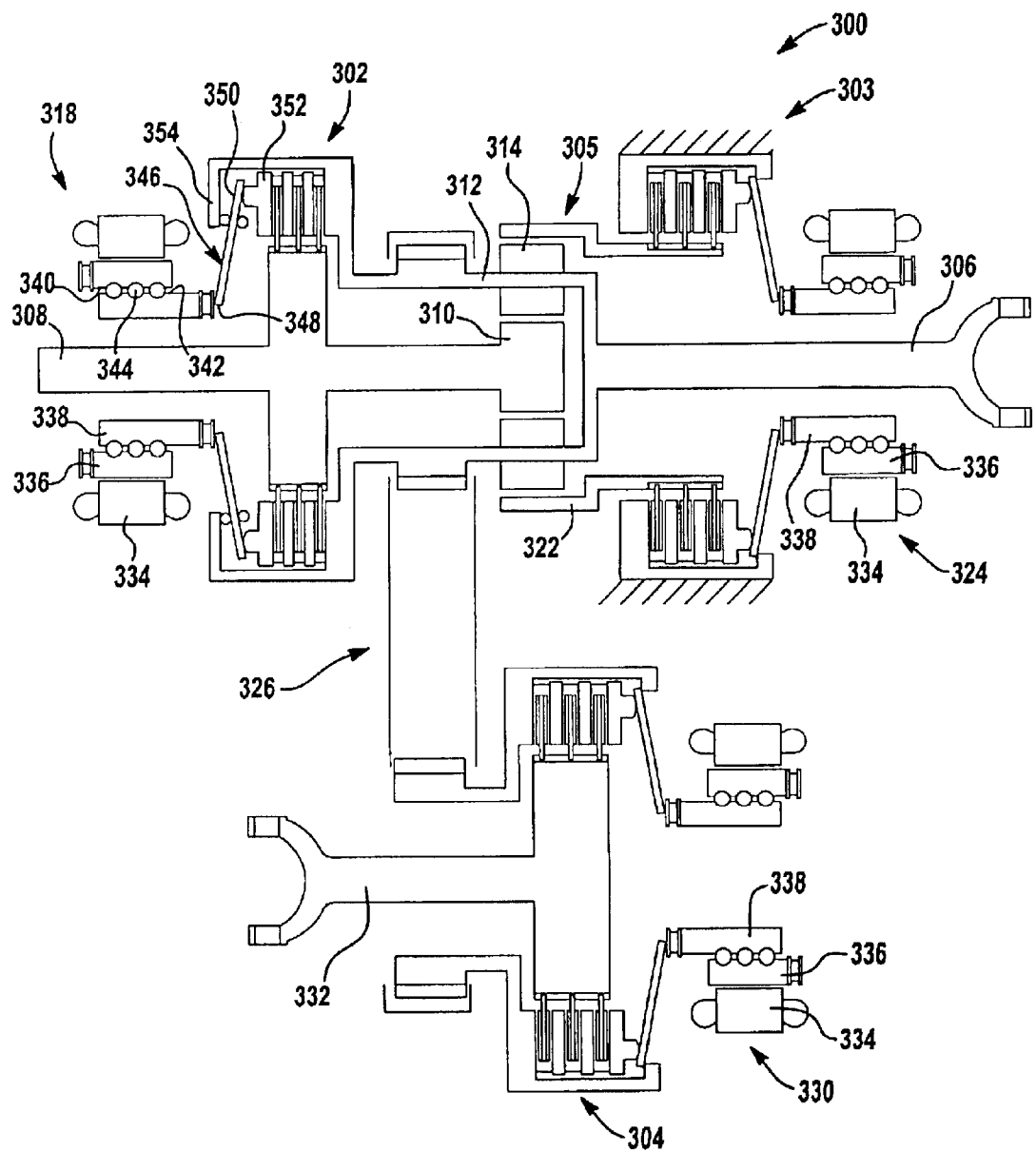
FIG. 5 is a schematic illustration of an alternate two speed transfer case incorporating the present invention.

FIG. 5 depicts an alternate embodiment two-speed power shift transfer case 300 is equipped with three transfer clutches 302, 303 and 304. It should be appreciated that each transfer clutch of transfer case 300 may be constructed similarly to previously described transfer clutch 50. Alternatively, transfer clutches 302, 303 and 304 may be constructed as described in greater detail hereinafter.

Transfer case 300 includes a planetary gear set 305 interconnecting the vehicle transmission and a rear output shaft 306. Planetary gear set 305 includes an input shaft 308, a sun gear 310 and a carrier 312 rotatably supporting a plurality of planet gears 314. Clutch 302 may also be described as a direct clutch. Direct clutch 302 is normally applied to interconnect input shaft 308, sun gear 310 and carrier 312 such that rear output shaft 306 rotates at the same speed as input shaft 308. Direct clutch 302 is applied during high range operation and released by electrically signaling a clutch actuator 318. Because approximately 90 percent of vehicle operation occurs in the high range mode, electrical power consumption is minimized by constructing direct clutch 302 as a normally applied clutch.

Clutch 303 functions as a brake to selectively couple a ring gear 322 of planetary gear set 305 to the housing. Brake 303 is normally released and selectively applied by electrically signaling a brake actuator 324. Brake 303 is applied when low range gearing is desirable. To achieve low range gearing, direct clutch 302 is disengaged while brake 303 is engaged.

A transfer assembly 326 transfers power from carrier 312 to clutch 304. Clutch 304 is an on-demand clutch which is normally released and selectively applied by electrically signaling a clutch actuator 330. Because on-demand clutch 304 is normally released, the driveline including rear output shaft 306 acts as a primary driveline. A secondary driveline includes a front output shaft 332 which is selectively drivable by transfer assembly 326 when on-demand clutch 304 is applied. Accordingly, it should be appreciated that any number of transfer clutches constructed in accordance with the teachings of the present invention may be incorporated within a power transmission device to simplify the power transmission and reduce the number of components required to accomplish this task.

Each alternate embodiment transfer clutch 302, 303 and 304, includes a clutch or brake actuator having a stator 334, a rotor 336 and a screw 338. Rotor 336 includes an internal thread 340 aligned with an external thread 342 of screw 338. A plurality of balls 344 are positioned between internal thread 340 and external thread 342. Stator 334 and rotor 336 are restrained from axial movement during operation. Accordingly, when electrical energy is input to stator 334 to cause rotor 336 rotate, screw 338 axially translates. A belleville spring 346 includes a substantially conically-shaped body having an inner portion 348 and an outer portion 350. Inner portion 348 is in contact with screw 338. Outer portion 350 is engaged with a pressure plate 352 of the friction clutch. Belleville spring 346 functions as a lever to multiply the force generated by screw 338. This arrangement allows for the use of a low force and low cost ball screw.

As shown in the drawings, the clutches or brake of transfer case 300 may be constructed as normally applied or normally released units. Specifically, an alternate fulcrum 354 is present in normally applied direct clutch 302. One skilled in the art will appreciate that while transfer case 300 includes two clutches and one brake constructed in accordance with the teachings of the present invention, a variety of similar power transfer mechanisms may be constructed using other combinations of clutching components. For example, rear differential 28 or front differential 38 may be equipped with one or more electric ball screw clutches to provide limited slip function and control.

Figure 6:
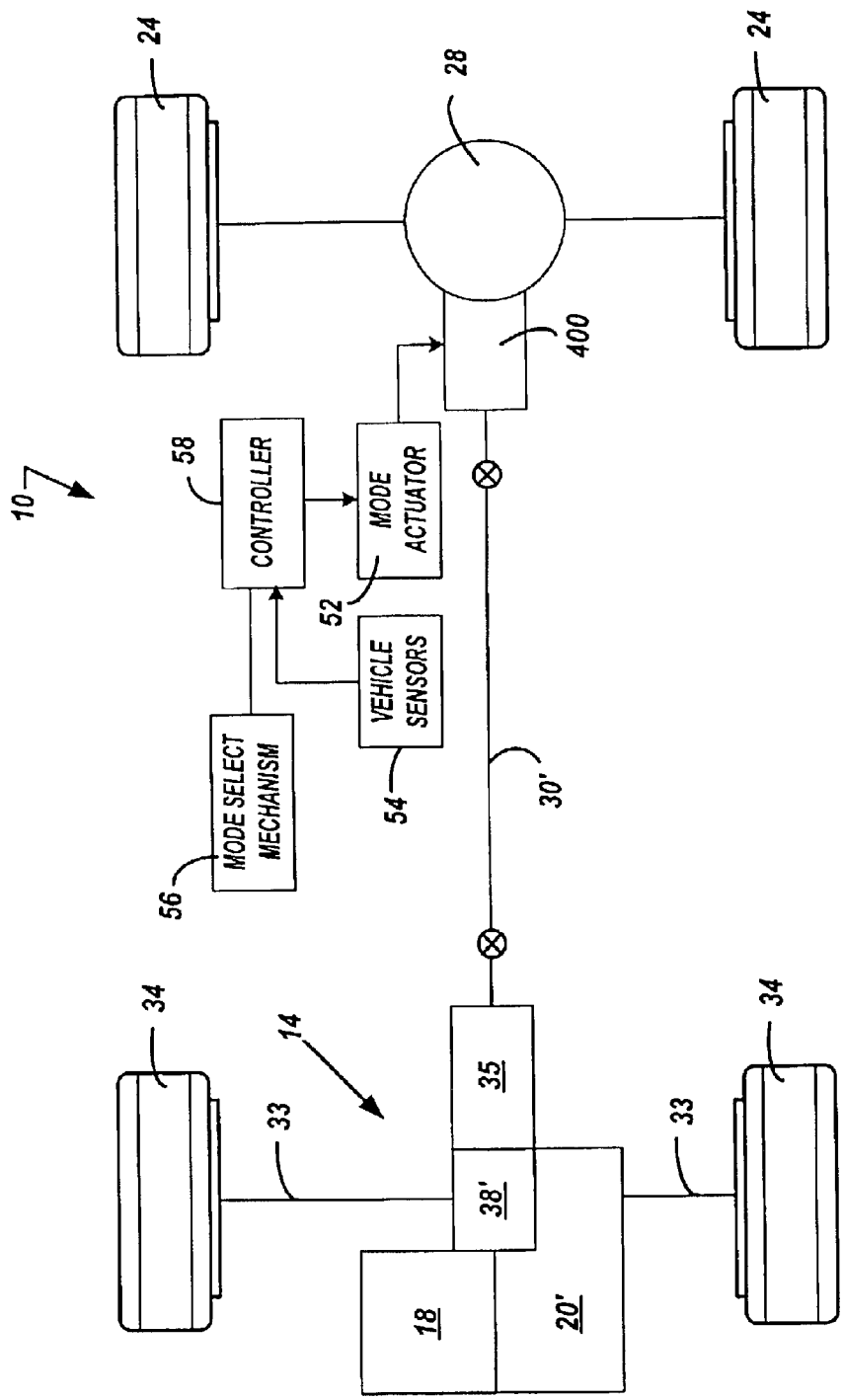
FIG. 6 is a schematic illustration of an alternative drivetrain for a four-wheel drive vehicle equipped with a power transmission device of the present invention.

To illustrate another alternative power transmission device to which the present invention is applicable, FIG. 6 schematically depicts a front-wheel based four-wheel drive layout. In particular, engine 18 drives a multi-speed transmission 20' having an integrated front differential unit 38' for driving front wheels 34 via axle shafts 33. A transfer unit 35 is also driven by transmission 20' for delivering drive torque to the input member of an in-line torque transfer coupling 400 via a drive shaft 30'. In particular, the input member of transfer coupling 400 is coupled to drive shaft 30' while its output member is coupled to a drive component of rear differential 28. Accordingly, when sensors indicate the occurrence of a front wheel slip condition, controller 58 adaptively controls actuation of torque coupling 400 such that drive torque is delivered "on-demand" to rear wheels 24. It is contemplated that torque transfer coupling 400 would include a transfer clutch generally similar in structure and function to that of any of the devices previously described herein. While shown in association with rear differential 28, it is contemplated that torque coupling 400 could be operably located for transferring drive torque from transfer unit 35 to drive shaft 30'.

Figure 7:
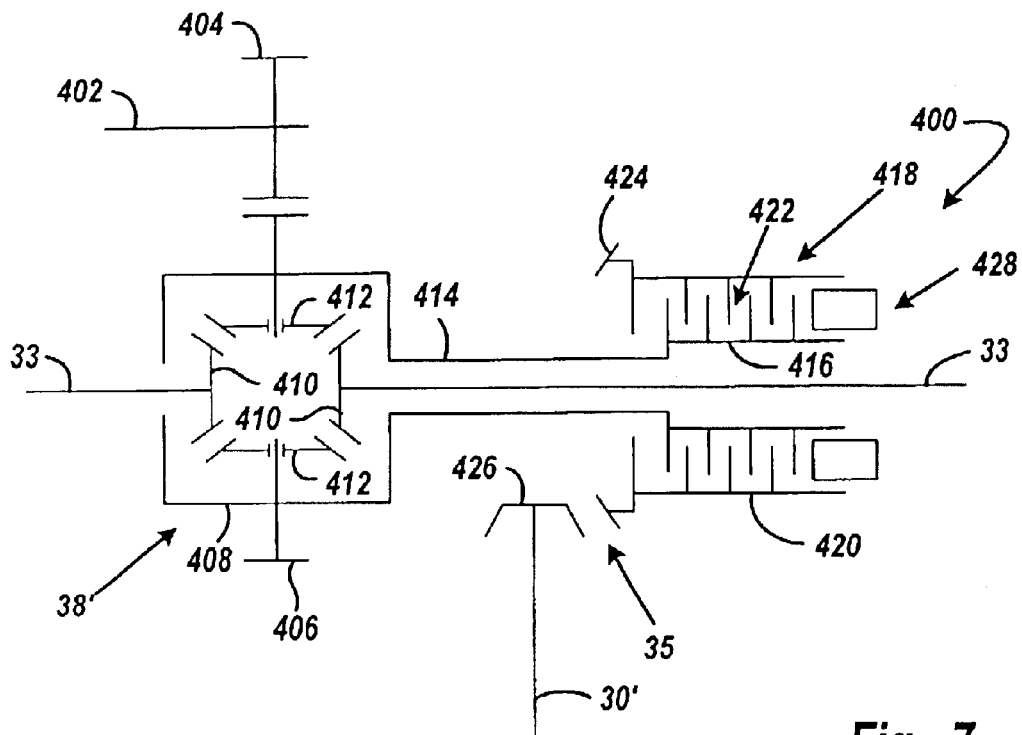
FIGS. 7 through 10 are schematic illustrations of alternative embodiments of power transmission devices according to the present invention.

Referring now to FIG. 7, torque coupling 400 is schematically illustrated in association with an on-demand four-wheel drive system based on a front-wheel drive vehicle similar to that shown in FIG. 6 except that torque coupling 400 is positioned to transfer torque from transfer unit 35 to drive shaft 30'. In particular, an output shaft 402 of transmission 20' is shown to drive an output gear 404 which, in turn, drives an input gear 406 fixed to a carrier 408 associated with front differential unit 38'. To provide drive torque to front wheels 34, front differential unit 38' includes a pair of side gears 410 that are connected to front wheels 34 via axleshafts 33. Differential unit 38' also includes pinions 412 that are rotatably supported on pinion shafts fixed to carrier 408 and which are meshed with side gears 410. A transfer shaft 414 is provided to transfer drive torque from carrier 408 to a clutch hub 416 associated with a multi-pate clutch assembly 418. Clutch assembly 418 further includes a drum 420 and a clutch pack 422 having interleaved clutch plates operably connected between hub 416 and drum 420.

Transfer unit 35 is a right-angled drive mechanism including a ring gear 424 fixed for rotation with drum 420 of clutch assembly 418 which is meshed with a pinion gear 426 fixed for rotation with drive shaft 30'. As seen, a clutch actuator 428 is schematically illustrated for controlling actuation of clutch assembly 418. According to the present invention, clutch actuator 428 is similar to any one of the various clutch actuators previously described in that an electric motor supplies torque to a first member of a ball screw to control translational movement of a second member of a ball screw for engaging clutch pack 422. In operation, drive torque is transferred from the primary (i.e., front) driveline to the secondary (i.e., rear) driveline in accordance with the particular mode selected by the vehicle operator via mode selector 56. For example, if the on-demand 4WD mode is selected, controller 58 modulates actuation of clutch actuator 428 in response to the vehicle operating conditions detected by sensors 54 by varying the value of the electric control signal sent to the electric motor. In this manner, the level of clutch engagement and the amount of drive torque that is transferred through clutch pack 422 to the rear driveline through transfer unit 35 and drive shaft 30' is adaptively controlled. Selection of a locked or full-time 4WD mode results in full engagement of clutch assembly 418 for rigidly coupling the front driveline to the rear driveline. In some applications, the mode selector 56 may be eliminated such that only the on-demand 4WD mode is available so as to continuously provide adaptive traction control without input from the vehicle operator.

Figure 8:
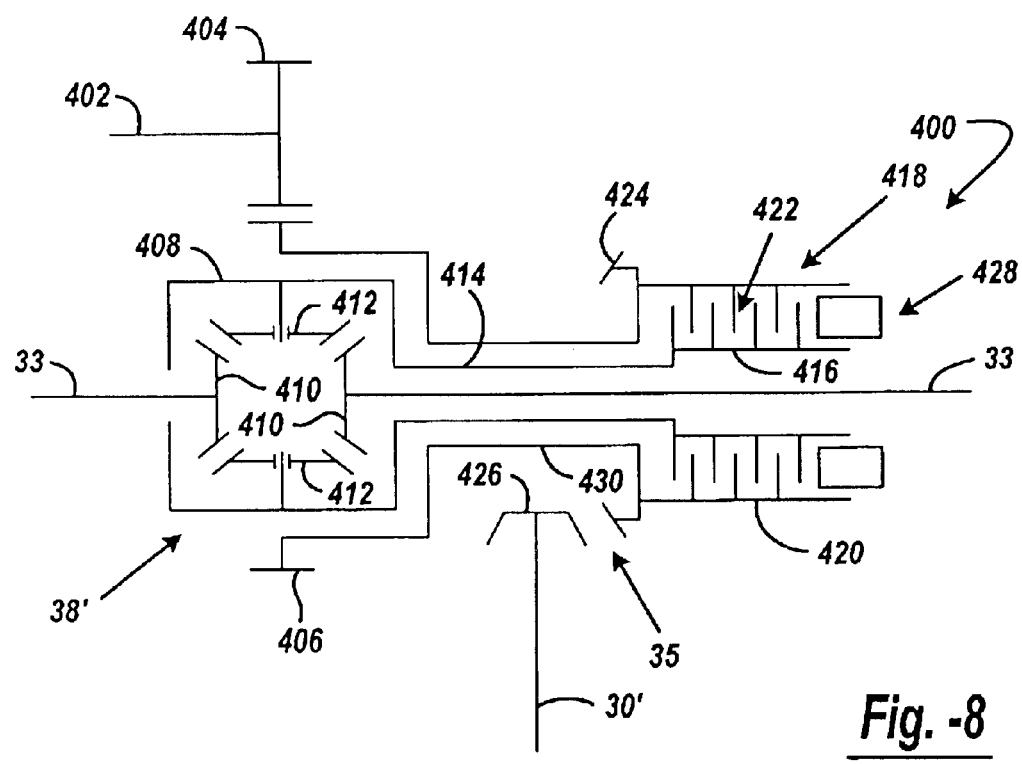

FIG. 8 illustrates a modified version of FIG. 7 wherein an on-demand four-wheel drive system based on a rear-wheel drive motor vehicle that is arranged to normally deliver drive torque to rear wheels 24 while selectively transmitting drive torque to front wheels 34 through torque coupling 400. In this arrangement, drive torque is transmitted directly from transmission output shaft 402 to transfer unit 35 via a drive shaft 430 interconnecting input gear 406 to ring gear 424. To provide drive torque to front wheels 34, torque coupling 400 is now shown operably disposed between drive shaft 430 and transfer shaft 414. In particular, clutch assembly 418 is arranged such that drum 420 is driven with ring gear 424 by drive shaft 430. As such, actuation of torque coupling 400 functions to transfer torque from drum 420 through clutch pack 422 to hub 416 which, in turn, drives carrier 408 of front differential unit 38' via transfer shaft 414.

Figure 9:
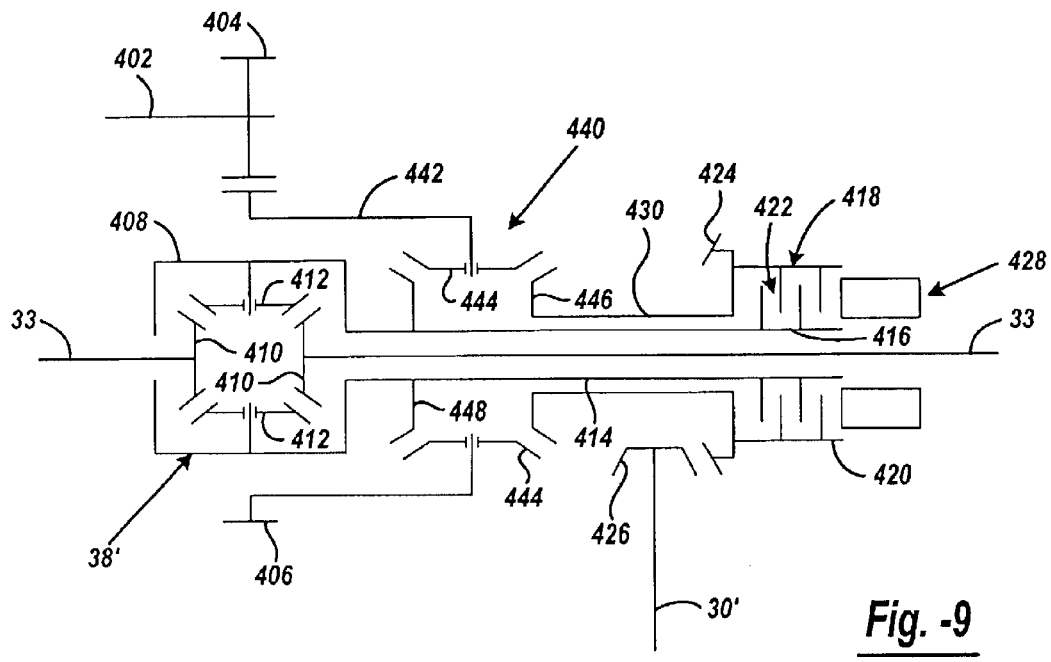

In addition to the on-demand 4WD systems shown previously, the power transmission (clutch actuator and clutch assembly) technology of the present invention can likewise be used in full-time 4WD systems to adaptively bias the torque distribution transmitted by a center or "interaxle" differential unit to the front and rear drivelines. For example, FIG. 9 schematically illustrates a full-time four-wheel drive system which is generally similar to the on-demand four-wheel drive system shown in FIG. 8 with the exception that an interaxle differential unit 440 is now operably installed between carrier 408 of front differential unit 38' and transfer shaft 414. In particular, input gear 406 is fixed for rotation with a carrier 442 of interaxle differential 440 from which pinion gears 444 are rotatably supported. A first side gear 446 is meshed with pinion gears 444 and is fixed for rotation with drive shaft 430 so as to be drivingly interconnected to the rear driveline through transfer unit 35. Likewise, a second side gear 448 is meshed with pinion gears 444 and is fixed for rotation with carrier 408 of front differential unit 38' so as to be drivingly interconnected to the front driveline. In operation, when sensor 54 detects a vehicle operating condition, such as excessive interaxle slip, controller 58 adaptively controls activation of the electric motor associated with clutch actuator 428 for controlling engagement of clutch assembly 418 and thus the torque biasing between the front and rear driveline.

Figure 10:
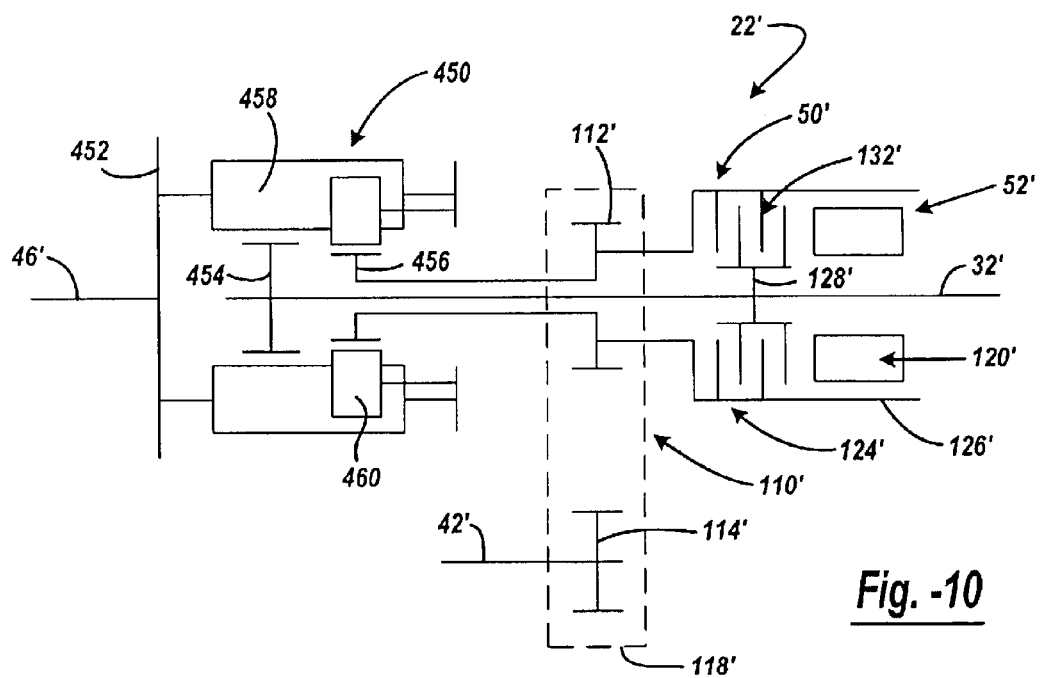

Referring now to FIG. 10, a full-time 4WD system is shown to include a transfer case 22' equipped with an interaxle differential 450 between an input shaft 46' and output shafts 32' and 42'. Differential 450 includes an input defined as a planet carrier 452, a first output defined as a first sun gear 454, a second output defined as a second sun gear 456, and a gearset for permitting speed differentiation between first and second sun gears 454 and 456. The gearset includes meshed pairs of first planet gears 458 and second pinions 460 which are rotatably supported by carrier 452. First planet gears 458 are shown to mesh with first sun gear 454 while second pinions 460 are meshed with second sun gear 456. First sun gear 454 is fixed for rotation with rear output shaft 32' so as to transmit drive torque to rear driveline 12. To transmit drive torque to front driveline 14, second sun gear 456 is coupled to a transfer assembly 110' which includes a first sprocket 112' rotatably supported on rear output shaft 32', a second sprocket 114' fixed to front output shaft 42', and a power chain 118'.

Transfer case 22' further includes a biasing clutch 50' having a multi-plate clutch assembly 124' and a mode actuator 52' (FIG. 6) having a clutch actuator 120'. Clutch assembly 124' includes a drum 126' fixed for rotation with first sprocket 112', a hub 128' fixed for rotation with rear output shaft 32', and a multi-plate clutch pack 132' operably disposed therebetween. Clutch actuator 120' includes an electric motor that can be energized for controlling the movement of a ball screw operator relative to clutch pack 132'.

Preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
   a rotary input member adapted to receive drive torque from a source of torque;
   a rotary output member adapted to provide drive torque to an output device; and
   a torque transfer mechanism operable for transferring drive torque from said input member to said output member, said torque transfer mechanism including a friction clutch assembly operably disposed between said input member and said output member and a clutch actuator operable for applying a clutch engagement force to said friction clutch assembly, said clutch actuator including an operator for selectively rotating a first threaded member relative to a second threaded member, said first threaded member and said second threaded member each being partially disposed within a space radially inward of said friction clutch assembly and between said friction clutch assembly and one of said input member and said output member, said clutch actuator having a plurality of balls disposed within said threads between said first and second threaded members, said second threaded member being restricted from rotation and operable to linearly translate in response to rotation of said first threaded member.

2. The power transmission of claim 1 wherein said clutch actuator includes a worm drive mechanism.

3. The power transmission of claim 2 wherein said worm drive mechanism includes a single tooth worm drivingly engaging a gear and wherein said gear is coupled to said first threaded member.

4. The power transmission of claim 1 wherein said friction clutch assembly includes an interleaved clutch pack having a first set of clutch plates fixed for rotation with said input member and a second set of clutch plates fixed for rotation with said output member, and a pressure plate, and wherein axial movement of said second threaded member causes said pressure plate to apply said clutch engagement force on said clutch pack.

5. The power transmission of claim 1 wherein said input member is a first output shaft of a transfer case and said output member is a second output shaft of said transfer case.

6. The power transmission of claim 1 wherein said input member is driven by a powertrain of a motor vehicle and said output member is connected to a differential of an axle assembly.

7. The power transmission of claim 1 wherein said clutch actuator includes an electric motor drivingly coupled to said first threaded member.

8. The power transmission of claim 7 further including a controller to establish the value of an electric control signal based on a rotary speed difference between said input member and said output member, and wherein said control signal is operable to vary the torque supplied from said electric motor for causing relative rotation between said first threaded member and said second threaded member which results in axial movement of said second threaded member relative to said friction clutch assembly.

9. A transfer case for use in a motor vehicle having a powertrain and first and second drivelines, comprising:
   a first shaft driven by the powertrain and adapted for connection to the first driveline;
   a second shaft adapted for connection to the second driveline;
   a torque transfer mechanism operable for transferring drive torque from said first shaft to said second shaft, said torque transfer mechanism including an input member driven by said first shaft, an output member driving said second shaft, a friction clutch assembly operably disposed between said input member and said output member, and a clutch actuator operable for applying a clutch engagement force on said friction clutch assembly, said clutch actuator including an operator for selectively rotating a first threaded member relative to a second threaded member, said clutch actuator having a plurality of balls disposed within said threads between said first and second threaded members, said second threaded member being restricted from rotation and operable to linearly translate in response to rotation of said first threaded member in response to electric control signals, said first threaded member and said second threaded member each being partially disposed within a space radially inward of said friction clutch assembly and between said friction clutch assembly and one of said input member and said output member; and
   a controller for generating said electric control signals.

10. The power transfer case of claim 9 wherein said clutch actuator includes a worm drive mechanism.

11. The transfer case of claim 10 wherein said worm drive mechanism includes a single tooth worm drivingly engaging a gear and wherein said gear is coupled to said first threaded member.

12. The transfer case of claim 9 wherein said friction clutch assembly includes an interleaved clutch pack having a first set of clutch plates fixed for rotation with said input member and a second set of clutch plates fixed for rotation with said output member, and a pressure plate, and wherein axial movement of said second threaded member causes said pressure plate to apply said clutch engagement force on said clutch pack.

13. The transfer case of claim 9 wherein said clutch actuator includes an electric motor drivingly coupled to said first threaded member.

14. The transfer case of claim 13 wherein said controller establishes the value of said electric control signal based on a rotary speed difference between said input member and said output member, and wherein said control signal is operable to vary the torque supplied from said electric motor for causing relative rotation between said first threaded member and said second threaded member which results in axial movement of said second threaded member relative to said friction clutch assembly.

* * * * *